S. G. MARLIN.
WATER WHEEL.
No. 180,612.  Patented Aug. 1, 1876.
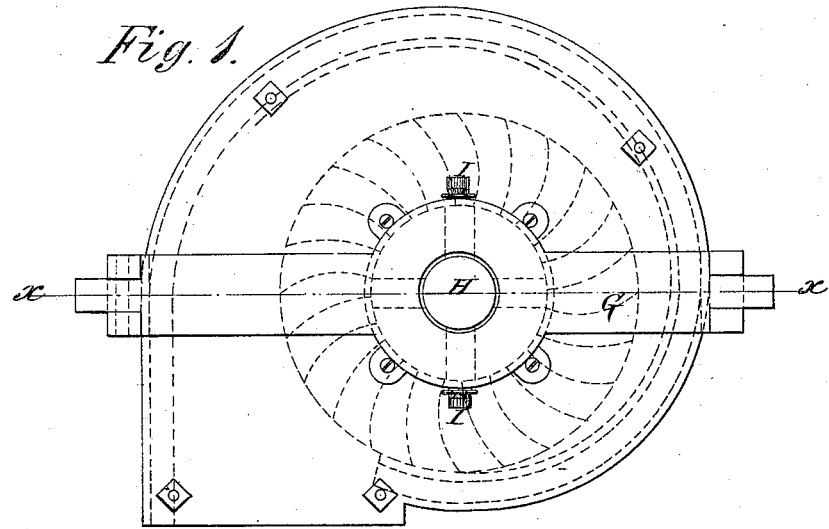
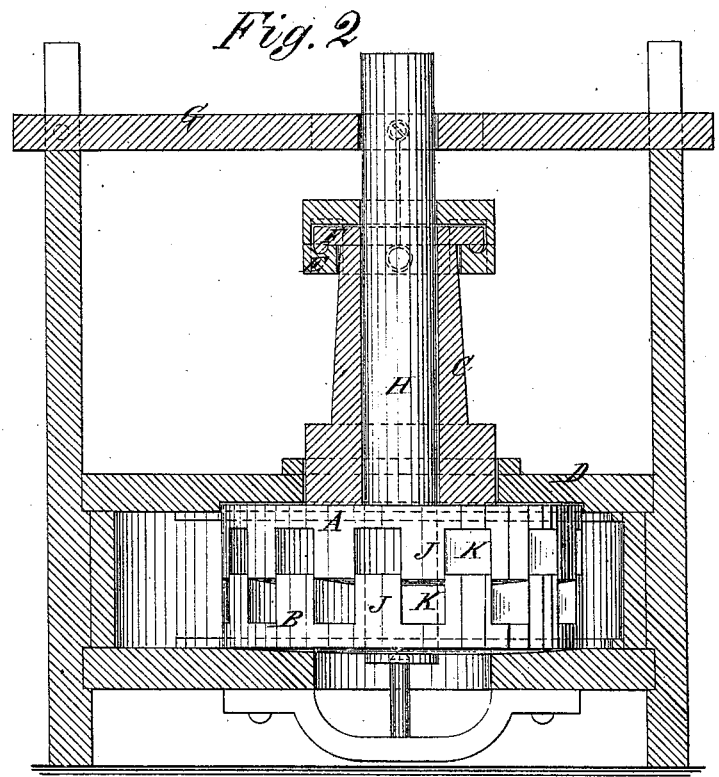

UNITED STATES PATENT OFFICE.

SAMUEL G. MARLIN, OF CLARION, PENNSYLVANIA.

IMPROVEMENT IN WATER-WHEELS.

Specification forming part of Letters Patent No. 180,612, dated August 1, 1876; application filed May 22, 1876.

*To all whom it may concern:*

Be it known that I, SAMUEL G. MARLIN, of Clarion, Clarion county, Pennsylvania, have invented a new and Improved Water-Wheel, of which the following is a specification:

The object of my invention is to contrive a water-wheel with issues that can be readily increased or diminished in capacity to correspond with different volumes of water or different amounts of power required, in order that the power of the water may be utilized in full measure whether the volume be large or small, which cannot be done when the volume of water is not sufficient to fill the issues.

The invention consists of a wheel composed of two disks placed side by side, each having buckets and issues, which are so adjusted that the buckets of one fit in the issues of the other, in such manner that by adjusting one of the disks toward or from the other the capacity of the issues may be raised to any extent, and may also be closed altogether, if required to serve for the gate.

Figure 1 is a top view of my improved wheel, and Fig. 2 is a sectional elevation on line $x$ $x$, Fig. 1.

Similar letters of reference indicate corresponding parts.

A represents the upper disk, and B the lower one. The former is attached to the short tubular shaft C, which extends up through the top D of the wheel-case, and is suspended on the collars E by its flange F, and the collars are suspended, by links I, from the bridge-plank G, which is to be raised or lowered at one end by an adjusting-screw or other contrivance for regulating the capacity of the issues. The disk B is attached to the main shaft H, which extends up through the tubular shaft C, and carries the pulley for transmitting the power. J represents the buckets, and K the issues, which are formed half in each disk, and the buckets of one interlock with the issues of the other, and they correspond in shape, so that they fill the issues as the disks are shifted together, and open them when shifted the other way.

Having thus described my invention, I claim as new and desire to secure by Letters Patent—

1. A water-wheel, consisting of two disks, A B, each having buckets J and issues K, which interlock, as described, and one of said disks being adjustable toward and from the other, to increase at will the capacity of the issues, substantially as specified.

2. The combination of disks A B, having buckets and issues, as described, tubular shaft C, suspended from the adjustable bridge-tree, and the main shaft H, all substantially as specified.

SAMUEL GRATZ MARLIN.

Witnesses:
 ISAAC MARLIN,
 JESSE D. PORTER.